(12) United States Patent
Rossignoli

(10) Patent No.: US 6,504,946 B1
(45) Date of Patent: Jan. 7, 2003

(54) METHOD OF PROCESSING MISORIENTED ITEMS IN AN IMAGE-BASED ITEM PROCESSING SYSTEM AND AN APPARATUS THEREFOR

(75) Inventor: James M. Rossignoli, Kitchener (CA)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/178,672

(22) Filed: Oct. 26, 1998

(51) Int. Cl.[7] .................................................. G06K 9/00
(52) U.S. Cl. ........................................ 382/139; 382/137
(58) Field of Search ................................. 382/137, 138, 382/135, 136, 139; 250/561; 235/472, 462

(56) References Cited

U.S. PATENT DOCUMENTS

| | | | | |
|---|---|---|---|---|
| 3,774,014 A | * | 11/1973 | Berler | 235/462.11 |
| 3,960,097 A | * | 6/1976 | Block | 112/322 |
| 4,401,299 A | * | 8/1983 | Muller | 270/54 |
| 4,634,148 A | * | 1/1987 | Greene | 283/70 |
| 5,000,088 A | * | 3/1991 | Cargill | 101/91 |
| 5,018,716 A | * | 5/1991 | Yoshida et al. | 271/227 |
| 5,021,676 A | * | 6/1991 | Dargon et al. | 250/561 |
| 5,061,955 A | * | 10/1991 | Watanabe | 355/45 |
| 5,208,869 A | * | 5/1993 | Holt | 382/7 |
| 5,534,684 A | * | 7/1996 | Danielson | 235/472 |
| 5,751,842 A | * | 5/1998 | Riach et al. | 382/137 |
| 5,917,931 A | * | 6/1999 | Kunkler | 382/137 |
| 6,019,364 A | * | 2/2000 | Svyatsky et al. | 271/186 |

* cited by examiner

Primary Examiner—Bhavesh Mehta
Assistant Examiner—Abolfazl Tabatabai
(74) Attorney, Agent, or Firm—Michael Chan

(57) ABSTRACT

A check processing system comprises an image lift device which is provided for lifting an image of a check as the check is being transported along a check feed path. A MICR reader is provided for reading a MICR codeline from the check as the check is transported along the check feed path past the MICR reader. The image of the check is reoriented when the MICR reader is unable to read a MICR codeline from the image of the check due to misorientation of the check along the check feed path.

15 Claims, 5 Drawing Sheets

METHOD OF PROCESSING MISORIENTED ITEMS IN AN IMAGE-BASED ITEM PROCESSING SYSTEM AND AN APPARATUS THEREFOR

BACKGROUND OF THE INVENTION

The present invention relates to processing items in an image-based item processing system, and is particularly directed to processing images of misoriented items in an image-based item processing system, such as an image-based check processing system, to provide assistance to an operator of the image-based check processing system.

A typical image-based check processing system includes a number of different types of workstations. The different types of workstations may include a document preparation workstation, an image capture workstation, a recognition workstation, a keying and balancing workstation, and an encoding workstation. Items such as bank checks are initially prepared at the document preparation workstation (e.g., removing staples, paper clips, and the like) for further processing at workstations downstream from the document preparation workstation. Each prepared item is fed along a document feed path of the image capture workstation which captures front and rear images of the item. The image capture workstation creates units of work and submits the created work to a workflow manager in a known way.

Workstations downstream from the image capture workstation poll the workflow manager in a known manner for work to perform, and may also create units of work which are submitted back to the workflow manager. The different workstations downstream from the image capture workstation process the front and rear images of each item. More specifically, the front and rear images of each item are sent to the recognition workstation which provides recognition results associated with the item. Operation of each workstation downstream from the recognition workstation, such as the keying and balancing workstation, and the encoding workstation, depends upon the recognition results provided by the recognition workstation.

The typical image-based check processing system further includes a MICR reader which is used to read a codeline from each item. The image-based check processing system may include an OCR reader which is used to read a codeline from an item in the form of an envelope which contains a damaged check, for example. In some known image-based check processing systems, the MICR reader provides a trigger signal when the MICR reader reads a particular codeline which indicates that the item which is moving along the document feed path is an envelope containing a damaged check. The trigger signal from the MICR reader is provided to activate the OCR reader. When the OCR reader is activated, the OCR reader attempts to read the codeline of the damaged check contained in the envelope which is moving along the document feed path. The OCR reader may be controlled via hardware and/or firmware associated with the OCR reader in its attempt to read the codeline of the damaged check contained in the envelope which is moving along the document feed path.

If the OCR reader is unable to read the codeline of an item (i.e., check or envelope, for example) which is moving along the document feed path, then a possibility exists that the item is physically misoriented along the document feed path. If no codeline is read because the item is physically misoriented along the document feed path, then the item is rejected and a corresponding misoriented front image of the item is usually displayed on a display screen at the keying and balancing workstation for viewing by a human operator. The human operator may then manually press a "FLIP" key or a "ROTATE" key on a keyboard at the keying and balancing workstation to reorient the front image of the item appearing on the display screen so that it is displayed in correct orientation on the display screen. After the front image of the item is displayed in correct orientation on the display screen, the human operator manually keys in the codeline of the item. Depending upon the number of items actually rejected due to misorientation problems, the amount of time and labor required by the human operator to correct orientation of misoriented items and then to manually key in codelines could be significant and, therefore, relatively costly.

SUMMARY OF THE INVENTION

In accordance with one aspect of the present invention, a method of processing misoriented documents in an image-based document processing system comprises the steps of (a) capturing an image of a document as the document is being transported along a document feed path, (b) reading a codeline from the document captured in step (a), and (c) reorienting the image of the document when the codeline is unable to be read in step (b).

Preferably, a MICR reader is actuated in an attempt to read the codeline. The image of the document captured in step (a) may be flipped from upside down to rightside up to a correct orientation. Alternatively, the image of the document captured in step (a) may be rotated to reverse front and rears sides of the image to a correct orientation.

In accordance with another aspect of the present invention, a check processing system comprises means defining a check feed path. An image lift device is provide for lifting an image of a check as the check is being transported along the check feed path. A reader is provided for reading a codeline from the check as the check is being transported along the check feed path past the reader. A processor executes a program to reorient the image of the check when the reader is unable to read a codeline from the check due to misorientation of the check along the check feed path. Preferably, the reader is a MICR reader for reading a MICR codeline from the check.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILS OF THE INVENTION

Figure 1:
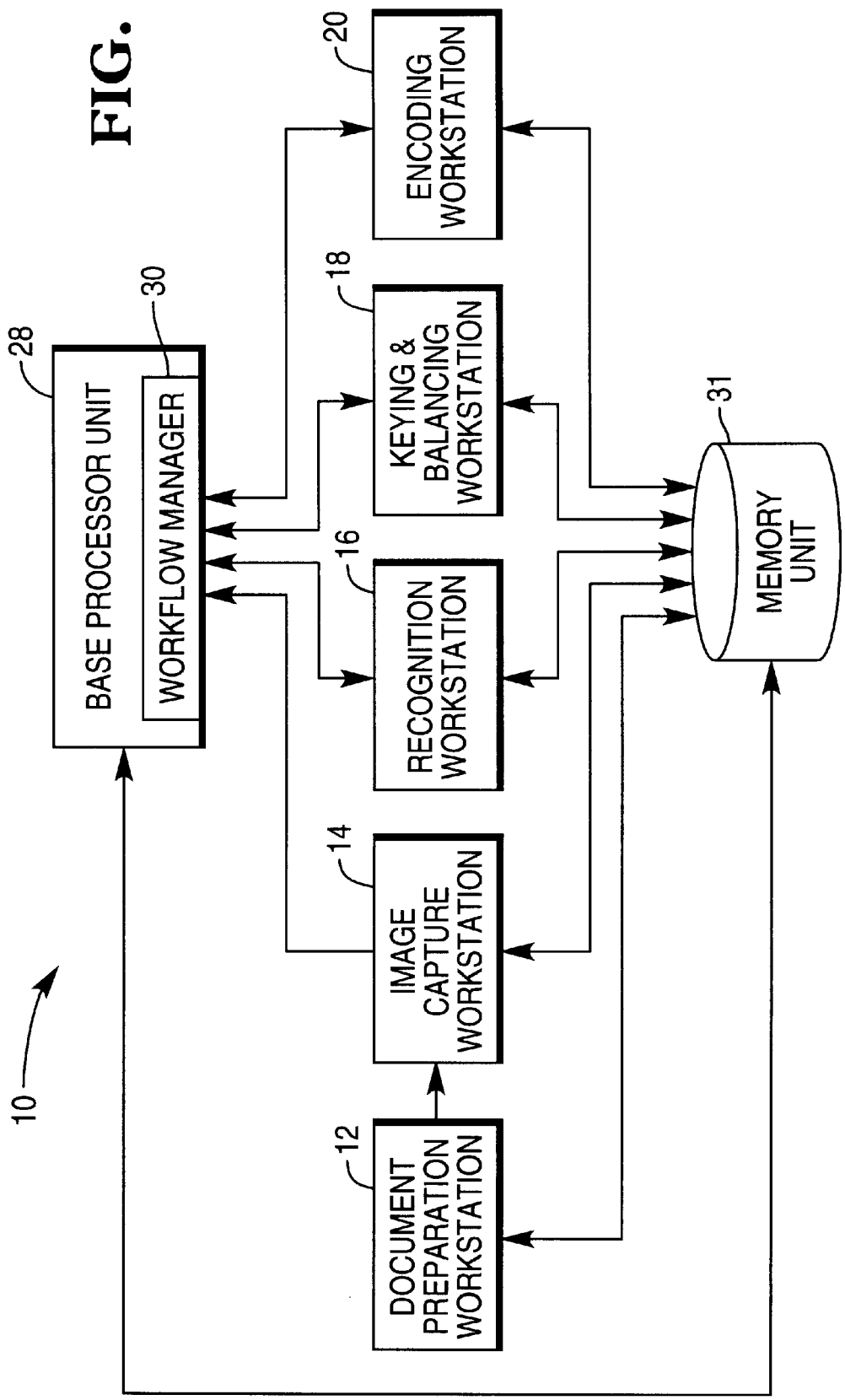
FIG. 1 is a schematic block representation of an image-based check processing system embodying the present invention.

The present invention is directed to processing images of misoriented items in an image-based item processing system to provide assistance to a human operator during operation of the image-based item processing system. The specific use of the method and apparatus described in the present application may vary. By way of example, an image-based item processing system in the form of an image-based check processing system 10 embodying the present invention is illustrated in FIG. 1.

The image-based check processing system 10 comprises different types of workstations including a document preparation workstation 12, an image capture workstation 14, a recognition workstation 16, a keying and balancing workstation 18, and an encoding workstation 20. At the document preparation workstation 12, transaction items including a number of debit items and a number of credit items associated with each transaction are prepared for further processing downstream from the document preparation workstation 12. Typical transaction items include checks, deposit slips, and carrier documents (i.e., envelopes) which carry damaged checks. Preparation of the transaction items may include removal of paper clips, staples, and the like, and stacking of the items in a particular order and/or direction in suitable trays. The trays containing the stacked items are then manually carted to the image capture workstation 14.

The image capture workstation 14 creates units of work and submits the created work to a workflow manager 30 in a known way. As shown in FIG. 1, the workflow manager 30 resides in non-volatile memory in a base processor unit 28 of the image-based check processing system 10. Each of the workstations 16, 18, 20, 22 polls the workflow manager 30 in a known manner for work to perform, and may also create units of work which is submitted back to the workflow manager 30.

Figure 2:
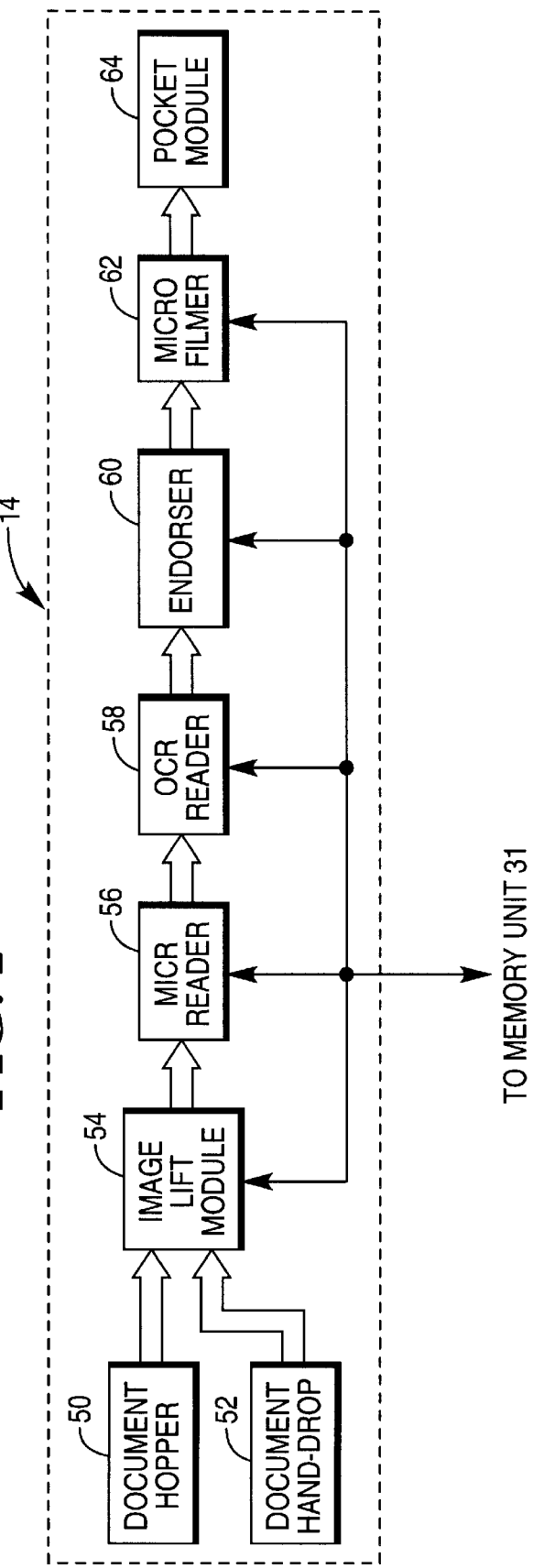
FIG. 2 is a schematic block representation of an image capture workstation in the image-based check processing system of FIG. 1.

Referring to FIG. 2, the image capture workstation 14 includes a document hopper 50 into which stacked items from the trays can be placed so that the items can be transported along a document feed path of the image capture workstation 14. The image capture workstation 14 also includes a document hand-drop 52 into which single items can be manually placed by a human operator so that the item can be merged into and then transported along the document feed path. The image capture workstation 14 further includes a number of different devices which lie along the document feed path. As shown in FIG. 2, the image capture workstation 14 includes an image lift module 54, a MICR reader 56, an OCR reader 58, an endorser 60, and a microfilmer 62, all of which lie along the document feed path. A pocket module 64 is disposed at the end of the document feed path. The pocket module 64 has a number of sorter pockets (not shown) for receiving and pocketing items which have been processed along the document feed path by the different devices along the document feed path.

During operation of the image capture workstation 14, the stacked items in the trays are manually removed from the trays and placed into the document hopper 50. A transport mechanism (not shown) picks items one-by-one from the document hopper 50 and transports the picked items along the document feed path of the image capture workstation 14 in a known manner. Each device lying along the document feed path processes each item transported along the document feed path in a manner described hereinbelow.

Figure 3:
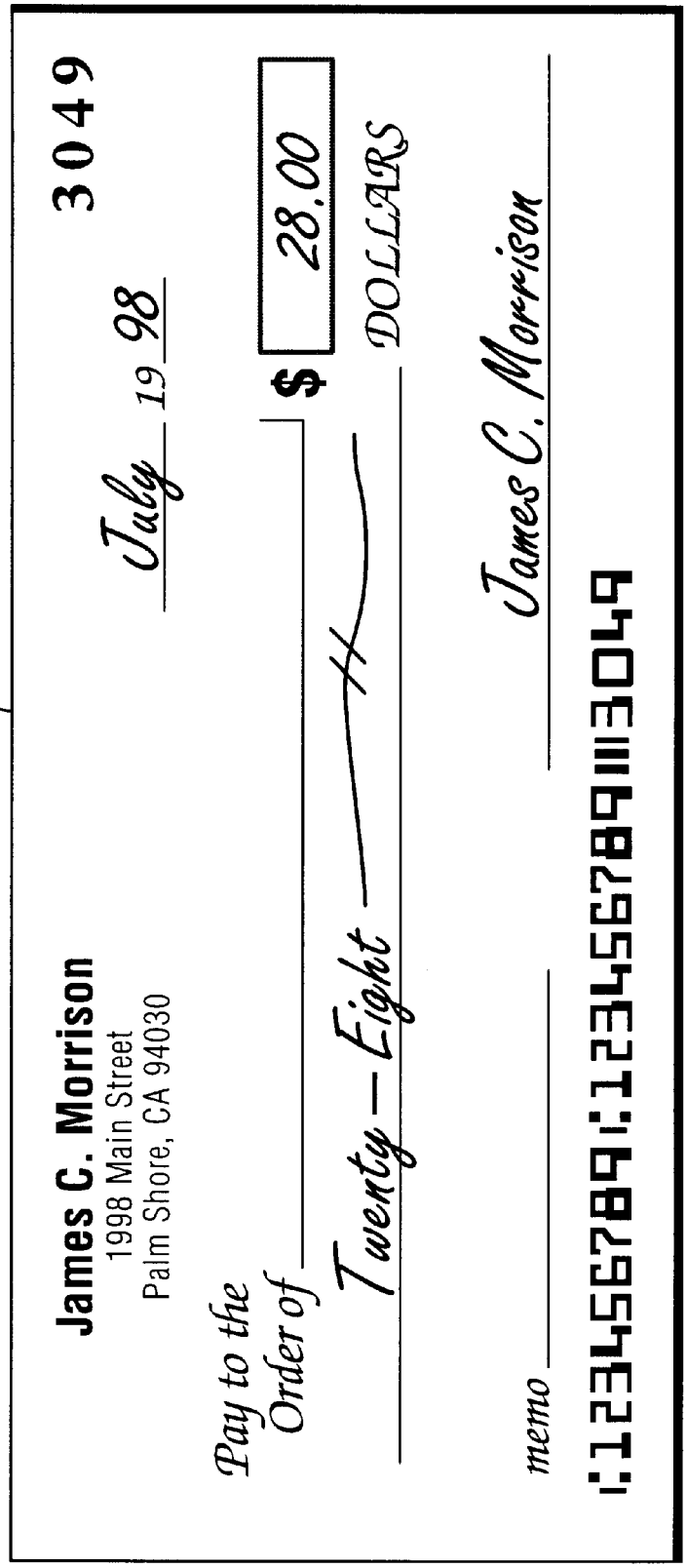
FIG. 3 is a front view of a check having a codeline thereon.

When an item such as a bank check 70 shown in FIG. 3, a front image lift camera (not shown) of the image lift module 54 lifts an image of the front side of the check. More specifically, the image lift camera optically scans the front side of the check 70 as the check moves along the document feed path past the image lift camera to produce a front electronic image of the check. The front image of the check 70 is stored in a memory unit 31. Other items (deposit slips or control documents including batch headers, for example) are processed in the same manner. It is contemplated that a rear image lift camera may also be used to lift an image of the rear of the check 70. However, for simplicity, it is assumed that only an image of the front side of the check 70 is lifted and processed, as described hereinbelow.

If the item moving downstream along the document feed path is in the form of an envelope which contains a damaged check, for example, the MICR reader 56 is unable to read a MICR codeline. The envelope containing the damaged check continues moving downstream along the document feed path. As the envelope continues to move further downstream along the document feed path, the OCR reader 58 attempts to read a codeline of the damaged check contained in the envelope. The OCR reader 58 is controlled via hardware and/or firmware associated with the OCR reader to read the codeline from the damaged check contained in the envelope.

If the item moving downstream along the document feed path is a check such as the check shown in FIG. 3, the MICR reader 56 reads a MICR codeline at the bottom of the check as the check passes by the MICR reader 56. Information from the MICR codeline of the check 70 including a unique sequence number is associated with the front image of the check and is also stored in the memory unit 31. Accordingly, the front image of the check 70 is stored in the memory unit 31 along with a unique sequence number.

The endorser 60 prints a suitable endorsement onto the check 70 as the check continues to move further downstream along the document feed path past the endorser 60. An endorsement status associated with the check 70 is then stored in the memory unit 31 along with the other information associated with the check. Also, the microfilmer 62 microfilms the check 70 as the check continues to move along the document feed path past the microfilmer 62. A microfilm status associated with the check 70 is then stored in the memory unit 31 along with the other information associated with the check.

After the front image of the check 70 is lifted by the image lift camera and the electronic image, the sequence number, and the MICR codeline are stored in the memory unit 31, and the check is endorsed and microfilmed, the check is sorted into an appropriate sorter pocket of the pocket module 64. Preferably, the image capture workstation 14 includes the Model 7780 Item Processing System, manufactured by NCR Corporation, located in Dayton, Ohio. The sorted checks in each of the sorter pockets are stacked in a respective tray. The trays containing the stacked checks are then manually carted to the encoding workstation 20 (FIG. 1).

During operation of the encoding workstation 20, the stacked checks in the trays are manually removed from the trays and placed into a document hopper (not shown) similar to the document hopper 50 of the image capture workstation 14 shown in FIG. 2. Each check is encoded in a known manner. Preferably, the image capture workstation 14 also includes the Model 7780 Item Processing System, manufactured by NCR Corporation, located in Dayton, Ohio. An encoder status associated with each check is also stored in the memory unit 31 along with the other information associated with the check.

The front electronic image, the sequence number, and the MICR codeline of the check 70 which were earlier obtained and stored in the memory unit 31 at the image capture workstation 14 is processed by the recognition workstation 16 and the keying and balancing workstation 18 in the manner described hereinbelow. At the recognition workstation 16, the front electronic image of each check stored in the memory unit 31 is processed using known recognition techniques to determine the "amount" associated with the check. The amount of the check is then associated with the corresponding front electronic image and the MICR codeline of the check and stored in the memory unit 31.

A one-to-one correspondence is thereby established between the front electronic image, the sequence number, the MICR codeline, the endorsement status, the encoder status, and the microfilm status of the check and the amount associated with that particular check. Accordingly, a database containing the front electronic image, the sequence number, the MICR codeline, the endorsement status, the encoder status, the microfilm status, and the amount associated with each check is thereby created and stored in the memory unit 31.

From time to time, it is possible that a check may be incorrectly oriented along the document feed path. When this occurs, the front image of the check 70 would be incorrectly oriented. The front image of the check 70 may be upside down (i.e., turned 180 degrees along its lengthwise dimension).

When the front image of the check 70 is upside down, a method in accordance with the present invention is provided to correct the orientation of the front image of the check without having to physically locate the check in one of the sorter pockets of the pocket module 64 and then reprocess the check by feeding it back through the image capture workstation 14. More specifically, after the image lift module 54 captures the front image of a check, an executable image reorienting program for reorienting the front image of the check in accordance with the present invention is executed.

Figure 4A:
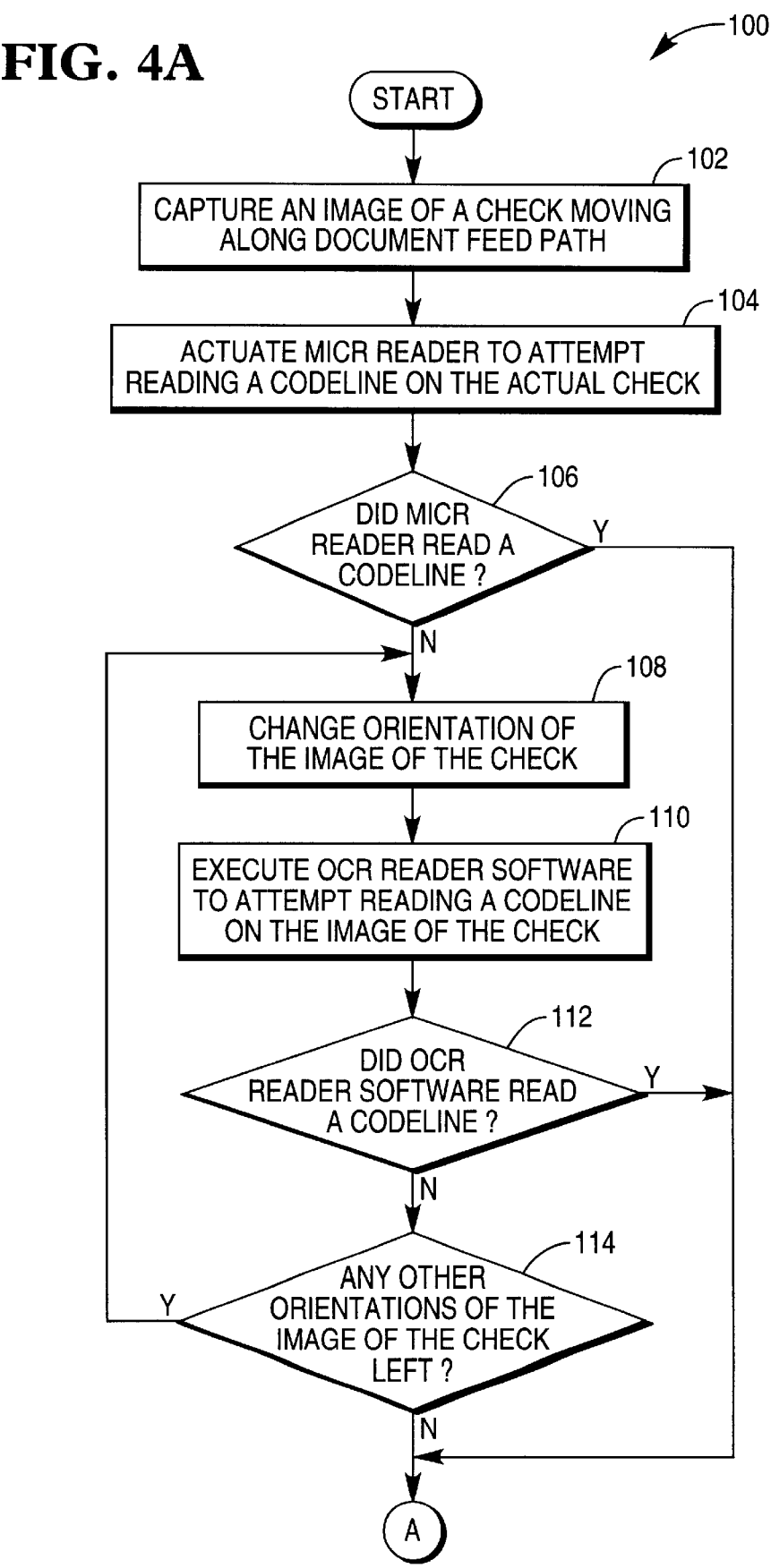
FIG. 4 is a flowchart depicting program steps which can be carried out by the image-based check processing system of FIG. 1 to process the check of FIG. 3 in accordance with the present invention.
Figure 4B:
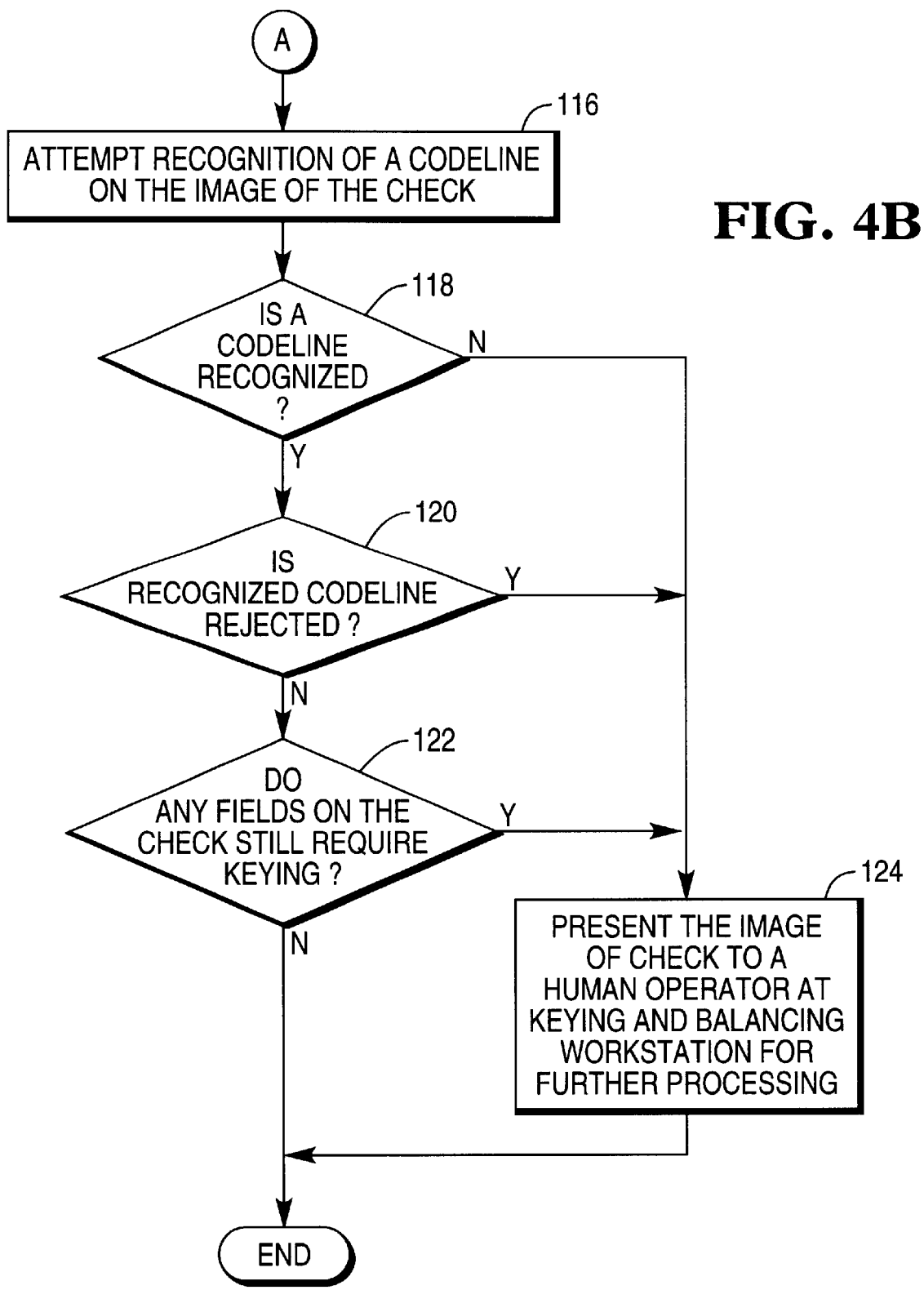

Referring to FIG. 4, a flowchart 100 depicts steps of the image reorienting program of the present invention which is initiated immediately after the image lift module 54 captures the front image of a check such as the check 70 of FIG. 3. In step 102, a front image of the check is captured by the image lift module 54. The MICR reader 56 is then actuated in step 104 to make an attempt to read a MICR codeline from the bottom of the check. The program proceeds to step 106 in which a determination is made as to whether or not the MICR reader 56 successfully read a MICR codeline from the bottom of the check.

If the determination in step 106 is affirmative, then the program proceeds to step 116 in which the recognition workstation 16 makes an attempt to recognize the codeline of the check based upon the front image data which was captured in step 102. However, if the determination in step 106 is negative, then the program proceeds to step 108 in which the front image of the check is reoriented to correct orientation. More specifically, the front image of the check is "flipped" 180 degrees along its lengthwise dimension.

After the front image of the check has been flipped, software associated with the OCR reader 58 is executed, as shown in step 110. When software associated with the OCR reader 58 is executed, an attempt is made to read a codeline from the front image data which was captured in step 102. The program then proceeds to step 112 in which a determination is made as to whether the software associated with the OCR reader 58 successfully read a codeline based upon the front image data which was captured in step 102.

If the determination in step 112 is affirmative, then the program proceeds to step 116 in which the recognition workstation 16 makes an attempt to recognize the codeline of the check based upon the front image data which was captured in step 102. If the determination in step 112 is negative, then the program proceeds to step 114 in which a determination is made as to whether any other orientations of the front image of the check remain which have not yet been tried. If the determination in step 114 is affirmative, then the program returns back to step 108 to again change orientation of the front image of the check. However, if the determination in step 114 is negative, then the program proceeds to step 116 in which the recognition workstation 16 makes an attempt to recognize the codeline of the check based upon the front image data which was captured in step 102.

After the recognition workstation 16 makes an attempt to recognize the amount of the check in step 116, the program proceeds to step 118 in which a determination is made as to whether a codeline has been successfully recognized. If the determination in step 118 is negative, then the program proceeds to step 124 in which the front image of the check is presented on a display screen of an image display terminal (not shown) at the keying and balancing workstation 18 in a known manner to allow a human operator to further process the front image of the check manually. For example, the human operator may press a "FLIP" key on a keyboard at the keying and balancing workstation 18 to reorient the front image of the check appearing on the display screen so that it is displayed in correct orientation on the display screen for the human operator to view. The human operator may also then key in the codeline of the check in a known manner.

However, if the determination in step 118 is affirmative, then the program proceeds to step 120 in which a determination is made as to whether the codeline recognized in step 116 is being rejected. If the determination in step 120 is affirmative, then the program proceeds directly to step 124 to present the front image of the check on the display screen of the image display terminal at the keying and balancing workstation 18. If the determination in step 120 is negative, the program proceeds to step 122.

In step 122, a determination is made as to whether there are any other fields on the check which still require keying in of information. If the determination in step 122 is negative, then the program proceeds directly to END. If the determination in step 122 is affirmative, the program proceeds to step 124 to present the front image of the check on the display screen of the image display terminal at the keying and balancing workstation 18 before proceeding to END.

A number of advantages result by providing improved assistance to a human operator during operation of the image capture workstation 14 in accordance with the present invention. One advantage is that the amount of time and labor required of the human operator to manually key in MICR codelines of checks is reduced. The amount of time and labor required to manually key in MICR codelines of checks is reduced because no manual keying in of a MICR codeline is needed to continue further processing downstream from the image lift module 54 when the front image of the check is processed in accordance with the present invention. The MICR codeline from the reoriented image can be read for purposes of further processing by other devices located downstream from the image lift module 54 and the MICR reader 56. The result is savings in time and labor costs and increased throughput of checks.

Although the above describes an image-based check processing system in which upside down images of items may be "flipped" rightside up, it is contemplated that overturned images of items (i.e., items which have their front and rear sides reversed along the document feed path) may be "rotated" to their correct orientation. In this case, the image lift module 54 of the image capture workstation 14 would need to include a rear image lift camera for lifting an image of the rear side of items as well as the front image lift camera for lifting an image of the front side of items. Also, in this case, a "ROTATE" key would be included on the keyboard at the keying and balancing workstation 18.

From the above description of the invention, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A check processing apparatus comprising:

means defining a check feed path along which a check having a magnetic ink character recognition (MICR) codeline associated therewith can be transported from an upstream end to a downstream end;

an image lift device for capturing image data which is representative of an image of the check as the check is transported from the up stream end of the check feed path to the downstream end of the check feed path;

a display for displaying the image of the check to allow an operator to view the image of the check;

a MICR reader for reading the MICR codeline of the check as the check is transported along the check feed path past the MICR reader; and a processor including means for, without any operator intervention, processing the image data which is representative of the image of the check on the display to reorient the image of the check to allow the operator to view the reoriented image of the check on the display when the MICR reader is unable to read the MICR codeline of the check due to misorientation of the check along the check feed path as the check is transported from the upstream end of the check feed path to the downstream end of the check feed path.

2. A check processing apparatus according to claim 1, further comprising an optical character recognition (OCR) reader for reading the MICR codeline of the check based upon the captured image data which is representative of the image of the check after the image of the check on the display has been reoriented.

3. A check processing apparatus according to claim 2, further comprising an endorser for endorsing a check as the check is transported from the upstream end of the check feed path to the downstream end of the check feed path.

4. A check processing apparatus according to claim 1, wherein the processing means of the processor includes means for, without any operator intervention, flipping the image of the check on the display from an upside down orientation of the image of the check to a rightside up orientation of the image of the check.

5. A check processing apparatus according to claim 1, wherein the processing means of the processor includes means for, without any operator intervention, rotating the image of the check on the display from a reverse orientation of the image of the check to a forward orientation of the image of the check.

6. A check processing apparatus comprising:

means defining a check feed path along which a check having a magnetic ink character recognition (MICR) codeline associated therewith can be transported from an upstream end to a downstream end;

an image lift device for capturing image data which is representative of an image of the check as the check is transported from the upstream end of the check feed path to the downstream end of the check feed path;

a display for displaying the image of the check to allow an operator to view the image of the check;

a MICR reader for reading the MICR codeline of the check as the check is transported along the check feed path past the reader; and a processor for executing a software program to automatically reorient the image of the check on the display when the MICR reader is unable to read the MICR codeline of the check due to misorientation of the check along the check feed path as the check is transported from the upstream end of the check feed path to the downstream end of the check feed path.

7. A check processing apparatus according to claim 6, further comprising an optical character recognition (OCR) reader for reading the MICR codeline of the check based upon the captured image data which is representative of the image of the check after the image of the check on the display has been reoriented.

8. A check processing apparatus according to claim 7, further comprising an endorser for endorsing a check as the check is transported from the upstream end of the check feed path to the downstream end of the check feed path.

9. A check processing apparatus according to claim 6, wherein the processor includes means for, without any operator intervention, flipping the image of the check on the display from an upside down orientation of the image of the check to a rightside up orientation of the image of the check.

10. A check processing apparatus according to claim 6, wherein the processor includes means for, without any operator intervention, rotating the image of the check on the display from a reverse orientation of the image of the check to a forward orientation of the image of the check.

11. A method of operating a check processing apparatus having a check feed path and a number of check processing devices disposed along the check feed path, the method comprising the steps of:

(a) capturing image data which is representative of an image of a check as the check is transported along the check feed path;

(b) displaying the image of the check on a display to allow an operator to view the image of the check;

(c) actuating a magnetic ink character recognition (MICR) reader to read a MICR codeline of the check as the check is transported along the check feed path; and (d) using a processor unit without any operator intervention to process the image data which is representative of the image of the check to reorient the image of the check on the display to allow the operator to view the reoriented image of the check on the display when the MICR codeline is unable to be read from the check in step (c).

12. A method according to claim 11, further comprising the step of:

(e) actuating an optical character recognition (OCR) reader to read the MICR codeline of the check based upon the captured image data which is representative of the image of the check after the image of the check on the display has been reoriented in step (d).

13. A method according to claim 12, further comprising the step of:

(f) endorsing a check as the check is transported from the upstream end of the check feed path to the downstream end of the check feed path.

14. A method according to claim 11, wherein step (d) includes the step of:

(d-1) using the processor unit without any operator intervention to flip the image of the check on the display from an upside down orientation of the image of the check to a rightside up orientation of the image of the check.

15. A method according to claim 11, wherein step (d) includes the step of:

(d-1) using the processor unit without any operator intervention to rotate the image of the check on the display from a reverse orientation of the image of the check to a forward orientation of the image of the check.

* * * * *